(12) United States Patent
Min

(10) Patent No.: US 11,186,246 B2
(45) Date of Patent: Nov. 30, 2021

(54) ROOFTOP AIRBAG APPARATUS

(71) Applicant: HYUNDAI MOBIS CO., LTD., Seoul (KR)

(72) Inventor: Byung Ho Min, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 38 days.

(21) Appl. No.: 16/735,408

(22) Filed: Jan. 6, 2020

(65) Prior Publication Data
US 2020/0223387 A1 Jul. 16, 2020

(30) Foreign Application Priority Data

Jan. 15, 2019 (KR) .................. 10-2019-0004946

(51) Int. Cl.
*B60R 21/214* (2011.01)
*B60R 21/233* (2006.01)
*B60R 21/2338* (2011.01)
*B60R 21/231* (2011.01)

(52) U.S. Cl.
CPC .......... *B60R 21/214* (2013.01); *B60R 21/233* (2013.01); *B60R 21/2338* (2013.01); *B60R 2021/23107* (2013.01); *B60R 2021/23192* (2013.01); *B60R 2021/23316* (2013.01); *B60R 2021/23386* (2013.01)

(58) Field of Classification Search
CPC . B60R 21/214; B60R 21/233; B60R 21/2338; B60R 2021/23107; B60R 2021/23192; B60R 2021/23316; B60R 2021/23386; B60R 21/232; B60R 2021/23161; B60R 21/213; B60R 21/23138; B60R 21/231
See application file for complete search history.

(56) References Cited

U.S. PATENT DOCUMENTS

| | | | | |
|---|---|---|---|---|
| 8,403,358 | B2 * | 3/2013 | Choi | B60R 21/214 280/728.2 |
| 8,414,017 | B2 * | 4/2013 | Lee | B60R 21/231 280/730.1 |
| 9,321,423 | B2 * | 4/2016 | Jaradi | B60R 21/214 |
| 9,725,064 | B1 * | 8/2017 | Faruque | B60N 2/143 |
| 2018/0215338 | A1 * | 8/2018 | Faruque | B60R 21/214 |
| 2019/0054888 | A1 * | 2/2019 | Fukawatase | B60R 21/231 |
| 2019/0106073 | A1 * | 4/2019 | Sundararajan | B60R 21/214 |
| 2019/0193665 | A1 * | 6/2019 | Jimenez | B60R 21/2338 |
| 2019/0202395 | A1 * | 7/2019 | Obayashi | B60R 21/23138 |
| 2019/0375363 | A1 * | 12/2019 | Abe | B60R 21/214 |
| 2020/0017058 | A1 * | 1/2020 | Jaradi | B60R 21/231 |
| 2020/0070763 | A1 * | 3/2020 | Hill | B60R 21/233 |

* cited by examiner

*Primary Examiner* — Drew J Brown
(74) *Attorney, Agent, or Firm* — H.C. Park & Associates, PLC

(57) ABSTRACT

A rooftop airbag apparatus including: a first cushion deployed along a ceiling of a vehicle body; a second cushion connected to the first cushion and deployed toward a bottom of the vehicle body; and a third cushion connected to the second cushion and deployed in a widthwise direction of the vehicle body.

14 Claims, 14 Drawing Sheets

ROOFTOP AIRBAG APPARATUS

CROSS-REFERENCE TO RELATED APPLICATION

This application claims priority from and the benefit of Korean Patent Application No. 10-2019-0004946, filed on Jan. 15, 2019, which is hereby incorporated by reference for all purposes as if set forth herein.

BACKGROUND

Field

Exemplary embodiments relate to a rooftop airbag apparatus, and more particularly, to a rooftop airbag apparatus which can prevent a collision between passengers and protect the heads of the passengers.

Discussion of the Background

In general, a vehicle has a rooftop window installed at the roof thereof. The rooftop window has a rooftop airbag installed at one side thereof so as to cover the rooftop window. At this time, the rooftop airbag covers the tops of front and rear seats. In case of a collision of the vehicle, the rooftop airbag is deployed as gas is injected into the rooftop airbag. The rooftop airbag prevents a passenger from being thrown out of the vehicle and protects the passenger, in case of a rollover (overturn) of the vehicle.

However, since the conventional rooftop airbag is evenly deployed to cover the rooftop window, the rooftop airbag cannot protect the head of the passenger when the head of the passenger moves forward. Furthermore, when a passenger in a front seat and a passenger in a rear seat are seated to face each other, the heads of the passengers may collide with each other in case of a vehicle collision. Therefore, when the passengers are seated facing each other, the possibility that the passengers will get injured may increase. Therefore, there is a need for a device capable of solving the problem.

The above information disclosed in this Background section is only for enhancement of understanding of the background of the invention and, therefore, it may contain information that does not constitute priori art.

SUMMARY

Exemplary embodiments of the present invention are directed to a rooftop airbag apparatus which can prevent a collision between passengers and protect the heads of the passengers.

In an exemplary embodiment, a rooftop airbag apparatus includes: a first cushion deployed along a ceiling of a vehicle body; a second cushion connected to the first cushion and deployed toward a bottom of the vehicle body; and a third cushion connected to the second cushion and deployed in a widthwise direction of the vehicle body.

The rooftop airbag apparatus may further include a tether connected to the first and second cushions so as to deploy the second cushion toward the bottom of the vehicle body.

A first inactive area may be provided between the first and second cushions, and a second inactive area may be provided between the second and third cushions.

The third cushion may be deployed in same direction as deployment direction of the first cushion.

The third cushion may be deployed in opposite direction of deployment direction of the second cushion.

The first cushion may be folded in a zigzag shape, the third cushion may be folded in a zigzag shape, and the third cushion folded in a zigzag shape may be wound in a roll shape with the second cushion.

In an exemplary embodiment, a rooftop airbag apparatus includes: a front airbag configured to cover a front side of a ceiling of a vehicle body; and a rear airbag configured to cover a rear side of the ceiling of the vehicle body. The front airbag includes: a first front cushion deployed along the ceiling of a front seat; a second front cushion connected to the first front cushion, and deployed from the first front cushion toward a bottom of the vehicle body; and a third front cushion connected to the first front cushion, and deployed in widthwise direction of the vehicle body from the second front cushion. The rear airbag includes: a first rear cushion deployed along the ceiling of a rear seat; a second rear cushion connected to the first rear cushion, and deployed from the first rear cushion toward the bottom of the vehicle body; and a third rear cushion connected to the second rear cushion, and deployed in widthwise direction of the vehicle body from the second rear cushion.

The front airbag may further include a front tether connected to the first and second front cushions so as to deploy the second front cushion toward the bottom of the vehicle, and the rear airbag may further include a rear tether connected to the first and second rear cushions so as to deploy the second rear cushion toward the bottom of the vehicle body.

A first front inactive area may be provided between the first and second front cushions, and a second front inactive area may be provided between the second and third front cushions.

A first rear inactive area may be provided between the first and second rear cushions, and a second rear inactive area may be provided between the second and third rear cushions.

The third front cushion may be deployed in same direction as deployment direction of the first front cushion, and the third rear cushion may be deployed in same direction as deployment direction of the first rear cushion.

The third front cushion may be deployed in opposite direction of deployment direction of the first front cushion, and the third rear cushion may be deployed in opposite direction of deployment direction of the first rear cushion.

The first front cushion may be folded in a zigzag shape, the third front cushion may be folded in a zigzag shape, and the third front cushion folded in a zigzag shape may be wound in a roll shape with the second front cushion.

The first rear cushion may be folded in a zigzag shape, the third rear cushion may be folded in a zigzag shape, and the third rear cushion folded in a zigzag shape may be wound in a roll shape with the second rear cushion.

In accordance with the present embodiments, since the third cushion is deployed to stand between the front and rear seats, the rooftop airbag apparatus can prevent a collision between the head of a passenger in a rear seat and the head of a passenger in a front seat, when the passengers and the front and rear seats are seated to face each other.

Furthermore, since the second cushion is deployed to stand between the seats disposed in the widthwise direction of the vehicle body, the rooftop airbag apparatus can prevent a collision between the passengers seated in the seats disposed next to each other.

Furthermore, since the first cushion is deployed in parallel along the ceiling of the vehicle body, the rooftop airbag apparatus can prevent a passenger from being thrown out of the vehicle in case of a roll-over of the vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
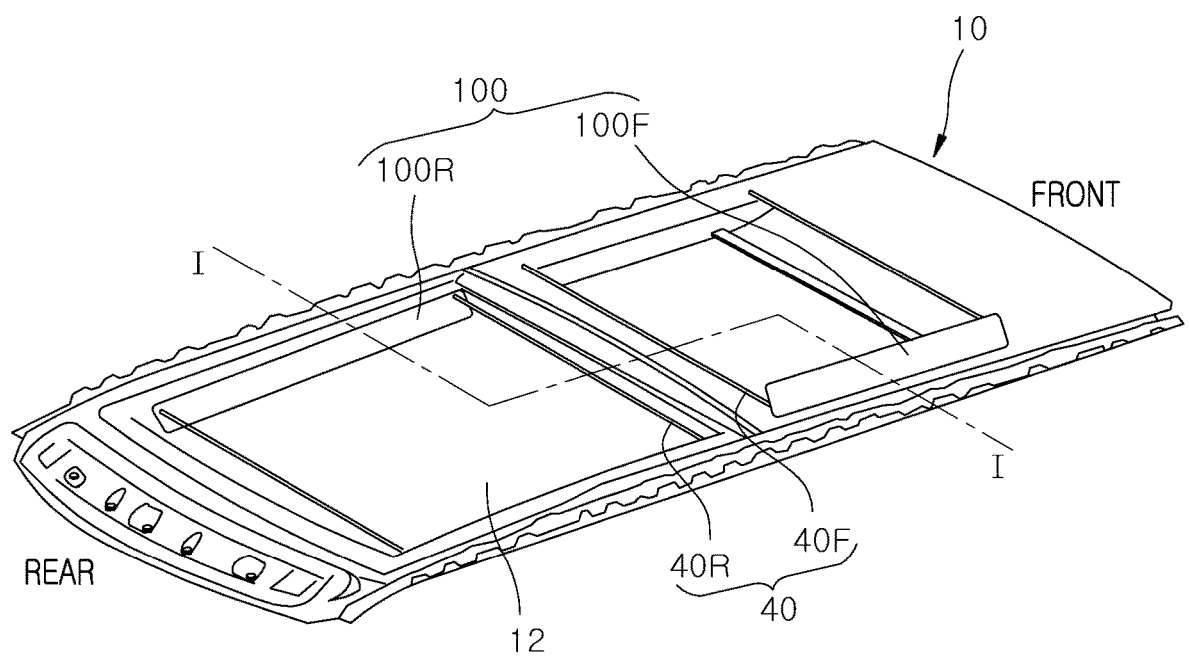
FIG. 1 is a perspective view illustrating that a rooftop airbag apparatus in accordance with an embodiment of the present disclosure is installed at the ceiling of a vehicle body.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, a rooftop airbag apparatus will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
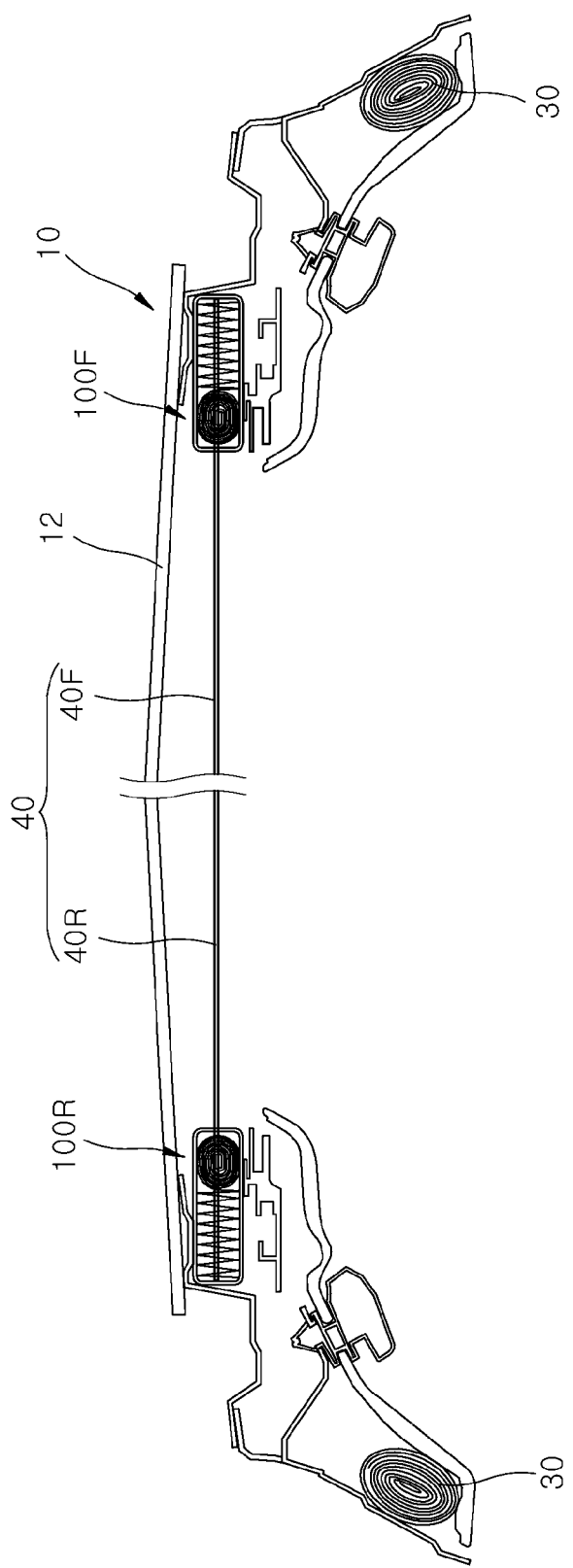
FIG. 2 is a cross-sectional view of the rooftop airbag apparatus in accordance with the embodiment of the present disclosure, taken along the line I-I in FIG. 1.
Figure 3:
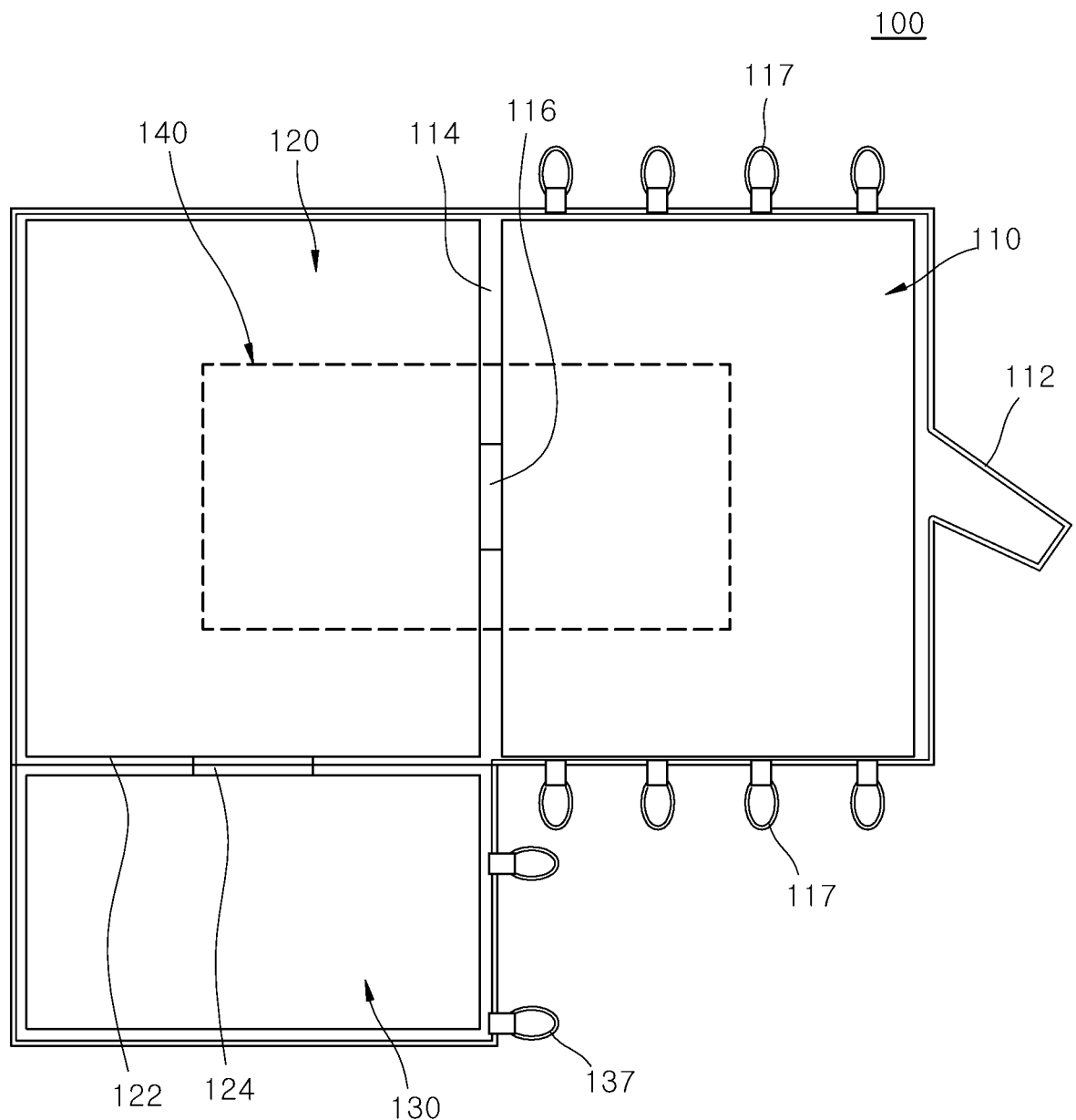
FIG. 3 is a plan view illustrating that the rooftop airbag apparatus in accordance with the embodiment of the present disclosure is unfolded.
Figure 4:
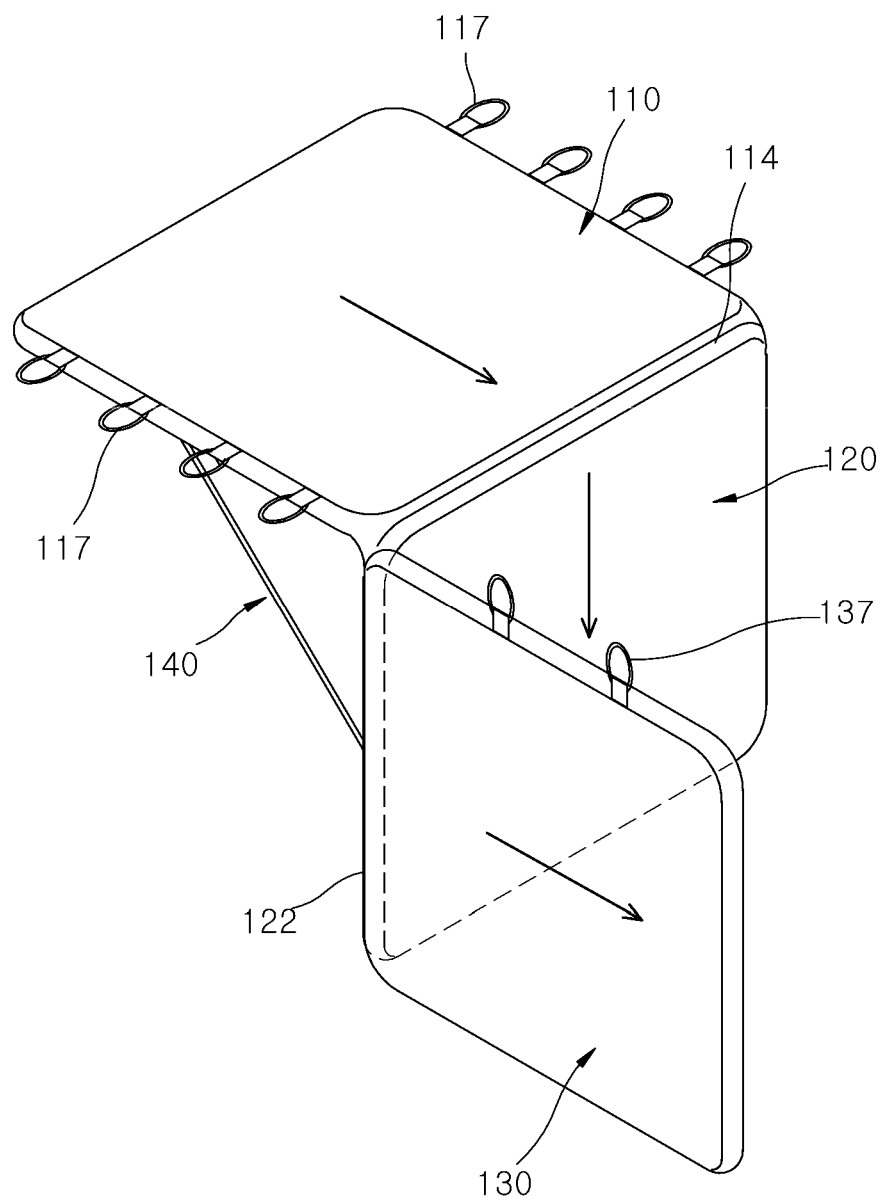
FIG. 4 is a perspective view illustrating that the rooftop airbag apparatus in accordance with the embodiment of the present disclosure is deployed.
Figure 5:
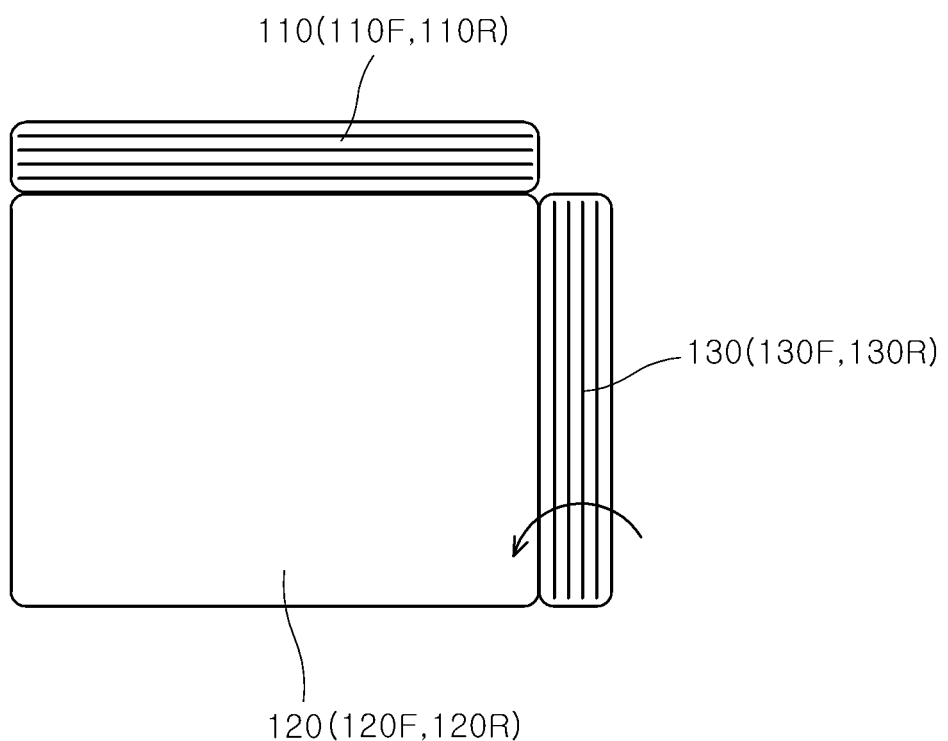
FIG. 5 is a plan view illustrating that first and third cushions are folded in a zigzag shape and a second cushion is unfolded in the rooftop airbag apparatus in accordance with the embodiment of the present disclosure.
Figure 6:
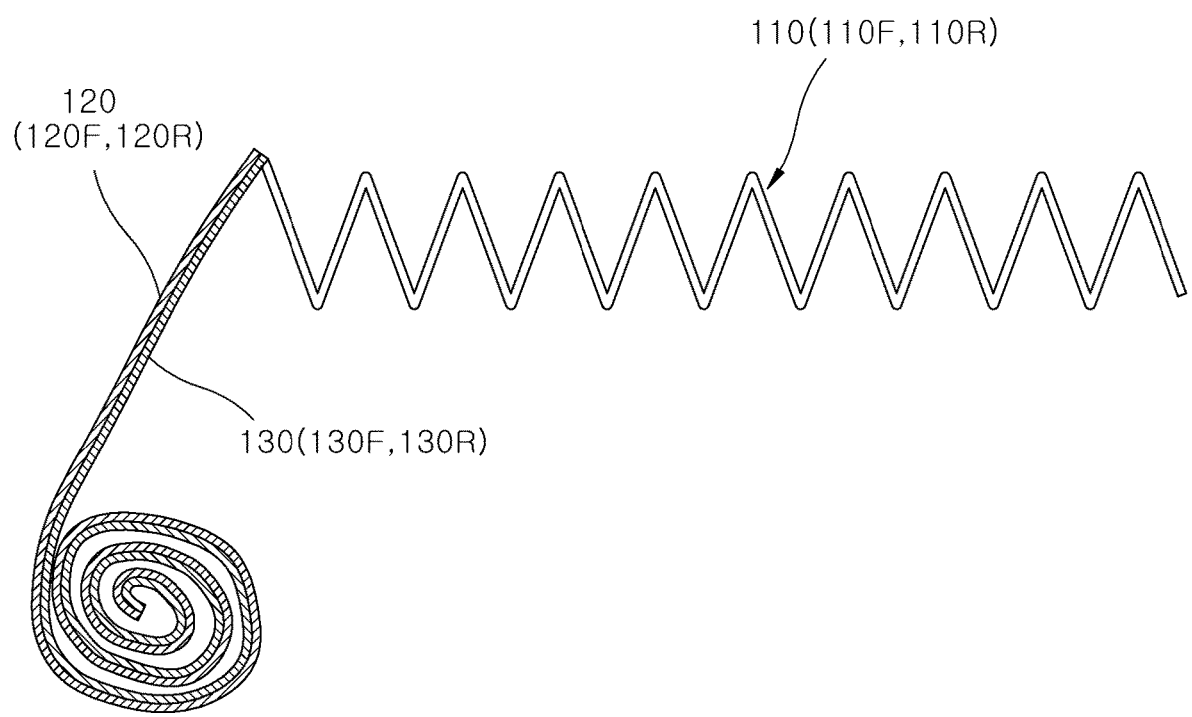
FIG. 6 is a side view illustrating that the first cushion is folded in a zigzag shape and the second and third cushions are wound in a roll shape in the rooftop airbag apparatus in accordance with the embodiment of the present disclosure.
Figure 7:
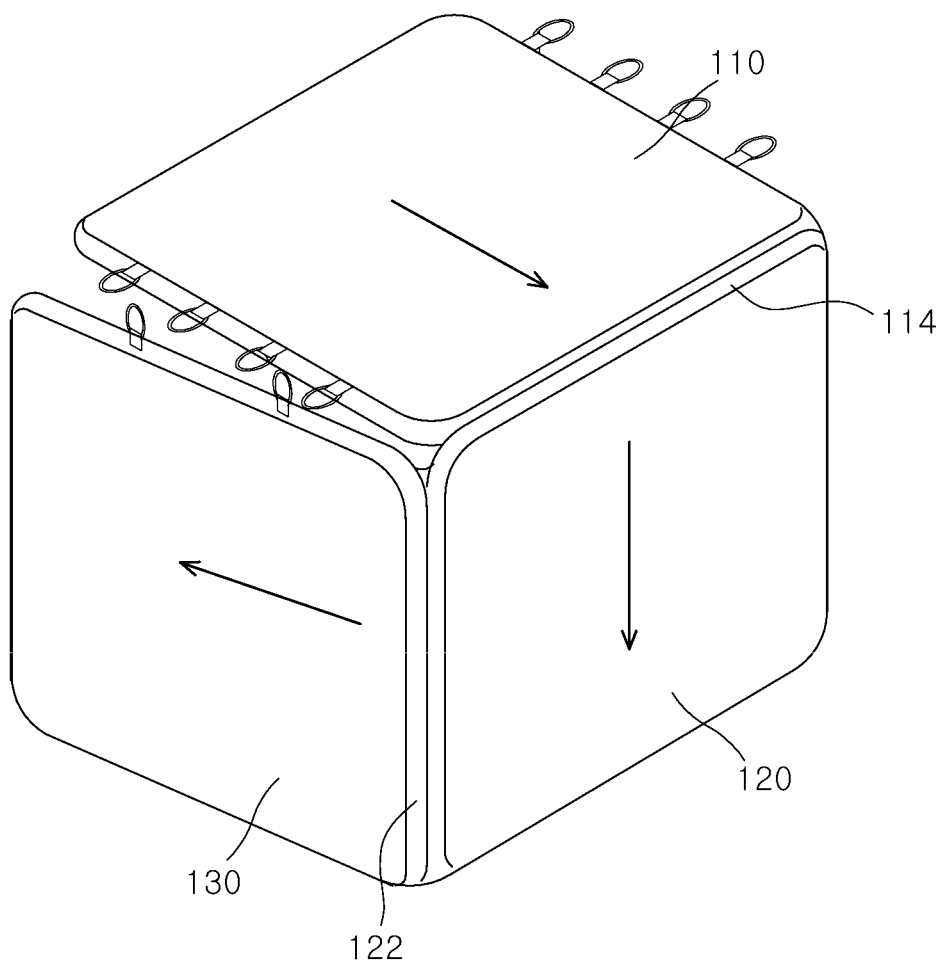
FIG. 7 is a perspective view illustrating a modification of the rooftop airbag apparatus in accordance with the embodiment of the present disclosure.

FIG. 1 is a perspective view illustrating that a rooftop airbag apparatus in accordance with an embodiment of the present disclosure is installed at the ceiling of a vehicle body, FIG. 2 is a cross-sectional view of the rooftop airbag apparatus in accordance with the embodiment of the present disclosure, taken along the line I-I, FIG. 3 is a plan view illustrating that the rooftop airbag apparatus in accordance with the embodiment of the present disclosure is unfolded, FIG. 4 is a perspective view illustrating that the rooftop airbag apparatus in accordance with the embodiment of the present disclosure is deployed, FIG. 5 is a plan view illustrating that first and third cushions are folded in a zigzag shape and a second cushion is unfolded in the rooftop airbag apparatus in accordance with the embodiment of the present disclosure, FIG. 6 is a side view illustrating that the first cushion is folded in a zigzag shape and the second and third cushions are wound in a roll shape in the rooftop airbag apparatus in accordance with the embodiment of the present disclosure, and FIG. 7 is a perspective view illustrating a modification of the rooftop airbag apparatus in accordance with the embodiment of the present disclosure.

Referring to FIGS. 1 to 7, the rooftop airbag apparatus 100 in accordance with the embodiment of the present disclosure includes a first cushion 110, a second cushion 120 and a third cushion 130.

A rooftop window 12 is installed at the ceiling of a vehicle body 10. At the ceiling, a guide 40 is formed to guide deployment of the first cushion 110. The guide 40 may be disposed in parallel to the widthwise direction of the vehicle body 10.

The pair of guides 40 are disposed in parallel to each other above each of a front seat 21 and a rear seat 23. A curtain airbag 30 is installed at either side of the vehicle body 10 in the widthwise direction. The curtain airbag 30 is deployed in case of a side collision of the vehicle.

The first cushion 110 is deployed along the ceiling of the vehicle body 10. The first cushion 110 has a gas injection part 112 connected to an inflator (not illustrated). When the first cushion 110 is deployed, the first cushion 110 may be inflated in a rectangular plate shape to cover the ceiling of the vehicle body 10.

The second cushion 120 is connected to the first cushion 110, and deployed toward the bottom of the vehicle body 10, i.e. road surface. The second cushion 120 is connected to one side of the first cushion 110, and the first cushion 110 has a first passage 116 to communicate with the second cushion 120.

The second cushion 120 is deployed to stand between the seats 21 and 23 disposed in the widthwise direction of the vehicle body 10. The second cushion 120 may be inflated in a rectangular plate shape to stand between both of the seats 21 and 23. The second cushion 120 serves to prevent passengers seated on the front seats 21 or the rear seats 23 from colliding with each other.

The third cushion 130 is connected to the second cushion 120, and deployed in the widthwise direction of the vehicle body 10. The third cushion 130 is connected to the front or rear side of the second cushion 120, and the second cushion 120 has a second passage 124 to communicate with the third cushion 130. The third cushion 130 may be inflated in a rectangular plate shape to stand between the front and rear seats 21 and 23. Specifically, the third cushion 130 may be inflated to block about a half of the space between the front and rear seats 21 and 23.

Each of the first to third cushions 110, 120 and 130 may have an inner tether or inner inactive area (not illustrated) to limit an expansion thickness.

Figure 8:
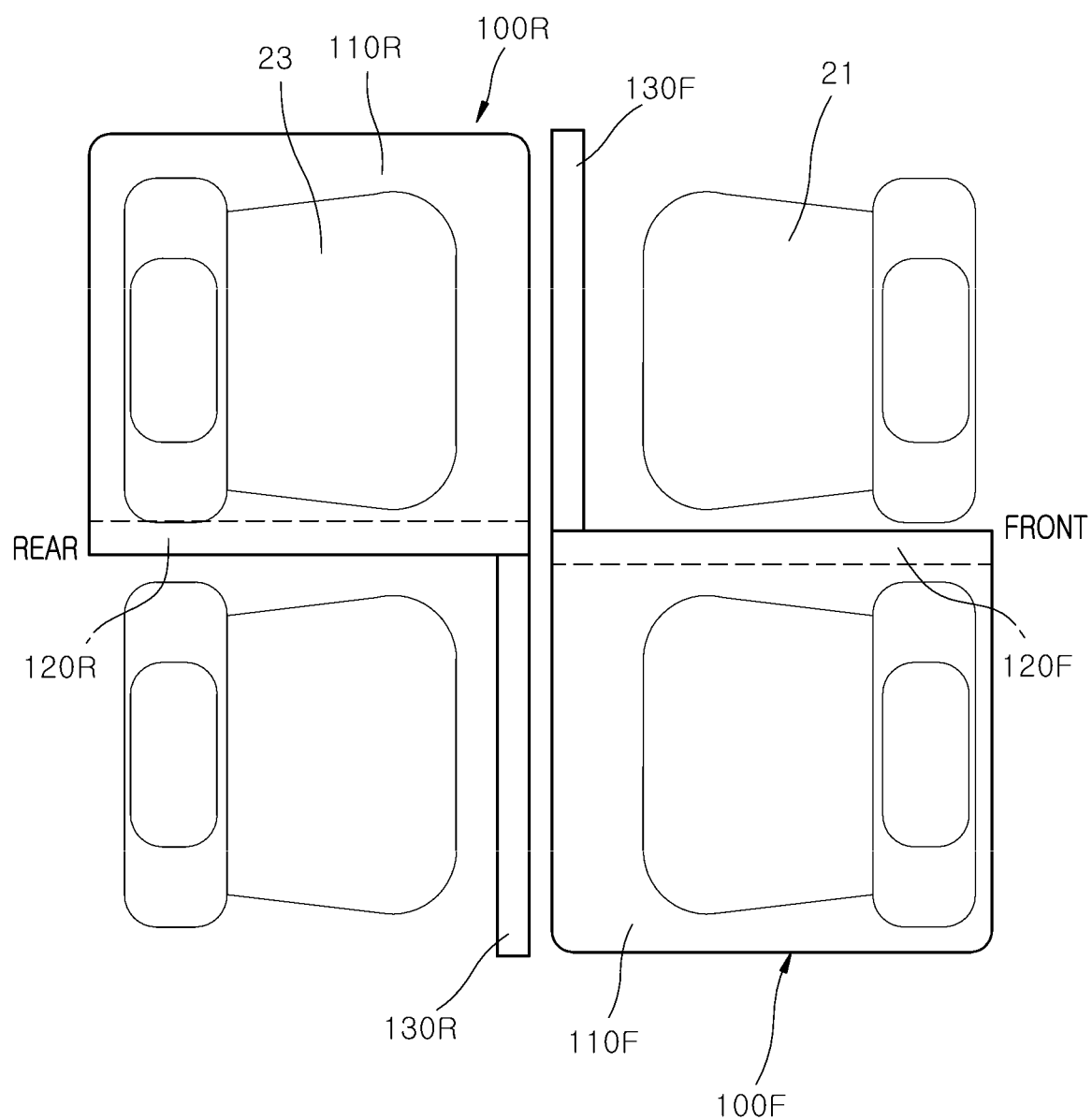
FIG. 8 is a plan view illustrating that the rooftop airbag apparatus in accordance with the embodiment of the present disclosure is installed on the front and rear sides of the vehicle body.

FIG. 8 illustrates that the passenger in the front seat 21 is seated to face backward and the passenger in the rear seat 23 is seated to face forward. However, when the passenger in the front seat 21 and the passenger in the rear seat 23 are all seated to face forward, the third cushion 130 protects the head of the passenger in the rear seat 23 when the head of the passenger seated on the rear seat 23 is moved to the front.

Furthermore, when the passenger in the front seat 21 and the passenger in the rear seat 23 are seated to face each other as illustrated in FIG. 8, the third cushion 130 prevents the head of the passenger in the rear seat 23 from colliding with the head of the passenger in the front seat 21.

The rooftop airbag apparatus 100 further includes a tether 140 which is connected to the first and second cushions 110 and 120 so as to deploy the second cushion 120 downward. The tether 140 may be a cotton tether made of rectangular fabric. The tether 140 may be constituted by a plurality of tether bands formed in a band shape.

Both sides of the tether 140 may be fixed to the first and second cushions 110 and 120 by a tether sewing part or adhesive. According to the length of the tether 140, an angle formed by the first and second cushions 110 and 120 may be changed.

When the second cushion 120 is deployed, the tether 140 pulls the second cushion 120 toward the first cushion 110. Therefore, the second cushion 120 may be deployed while bent downward by tension of the tether 140. Furthermore, when the second cushion 120 is deployed, the tether 140 is obliquely disposed so as not to come in contact with the head of the passenger.

A first inactive area 114 is provided between the first and second cushions 110 and 120, and a second inactive area 122 is provided between the second and third cushions 120 and 130. Each of the first and second inactive areas 114 and 122 is an area where two sheets of fabric are attached to each other in order to prevent introduction of gas.

The first and second inactive areas 114 and 122 may be formed by a sewing part. The first inactive area 114 may be formed in parallel to the front-to-rear direction of the vehicle body 10, and the second inactive area 122 may be formed in parallel to the top-to-bottom direction of the vehicle body 10.

Since the first inactive area 114 is formed at the boundary between the first and second cushions 110 and 120, the second cushion 120 may be deployed perpendicular or almost perpendicular to the first cushion 110. Since the second inactive area 122 is formed at the boundary between the second and third cushions 120 and 130, the third cushion 130 may be deployed perpendicular or almost perpendicular to the second cushion 120.

Therefore, in case of a roll-over of the vehicle, the first cushion 110 prevents a passenger from colliding with the rooftop window 12 or being thrown out of the vehicle, the second cushion 120 prevents a collision between the heads of the passengers on the left and right sides, and the third cushion 130 prevents a collision between the heads of the passengers on the front and rear sides.

The third cushion 130 is deployed in the same direction as the deployment direction of the first cushion 110. For example, when the first cushion 110 is deployed from one side of the vehicle body 10 in the widthwise direction toward the center thereof, the third cushion 130 may be deployed from the center of the vehicle body 10 in the widthwise direction toward the other side thereof.

The first cushion 110 has a plurality of first rings 117 connected to either side thereof in the front-to-rear direction such that the plurality of first rings 117 are movably coupled to the guide 40, and the third cushion 130 has a plurality of third rings 137 connected to the top thereof such that the plurality of third rings 137 are movably coupled to the guide 40.

The first rings 117 support both sides of the first cushion 110 or specifically the front and rear sides of the first cushion 110 when the first cushion 110 is deployed, and the third rings 137 support the top of the third cushion 130 when the third cushion 130 is deployed. Since the first and third rings 117 and 137 guide the deployment directions of the first and third cushions 110 and 130, the first and third rings 117 and 137 may suppress distortions or changes in the deployment directions of the first and third cushions 110 and 130.

The first cushion 110 is folded in a zigzag shape, the third cushion 130 is folded in a zigzag shape. The third cushion 130 folded in a zigzag shape is wound in a roll shape with the second cushion 120. Therefore, the first cushion 110 folded in a zigzag shape is unfolded and deployed in a straight line shape, the second cushion 120 wound in a roll shape is unwound and deployed downward, and the third cushion 130 folded in a zigzag shape is unfolded and deployed in a straight line shape.

The third cushion 130 may be deployed in the opposite direction of the deployment direction of the second cushion 120 (see FIG. 7). For example, when the first cushion 110 is deployed from one side of the vehicle body 10 in the widthwise direction toward the center thereof, the third cushion 130 may be deployed from the center of the vehicle body 10 in the widthwise direction toward the one side thereof. At this time, a separate guide may be further installed to guide movement of the third rings 137 when the third cushion 130 is deployed.

Figure 9:
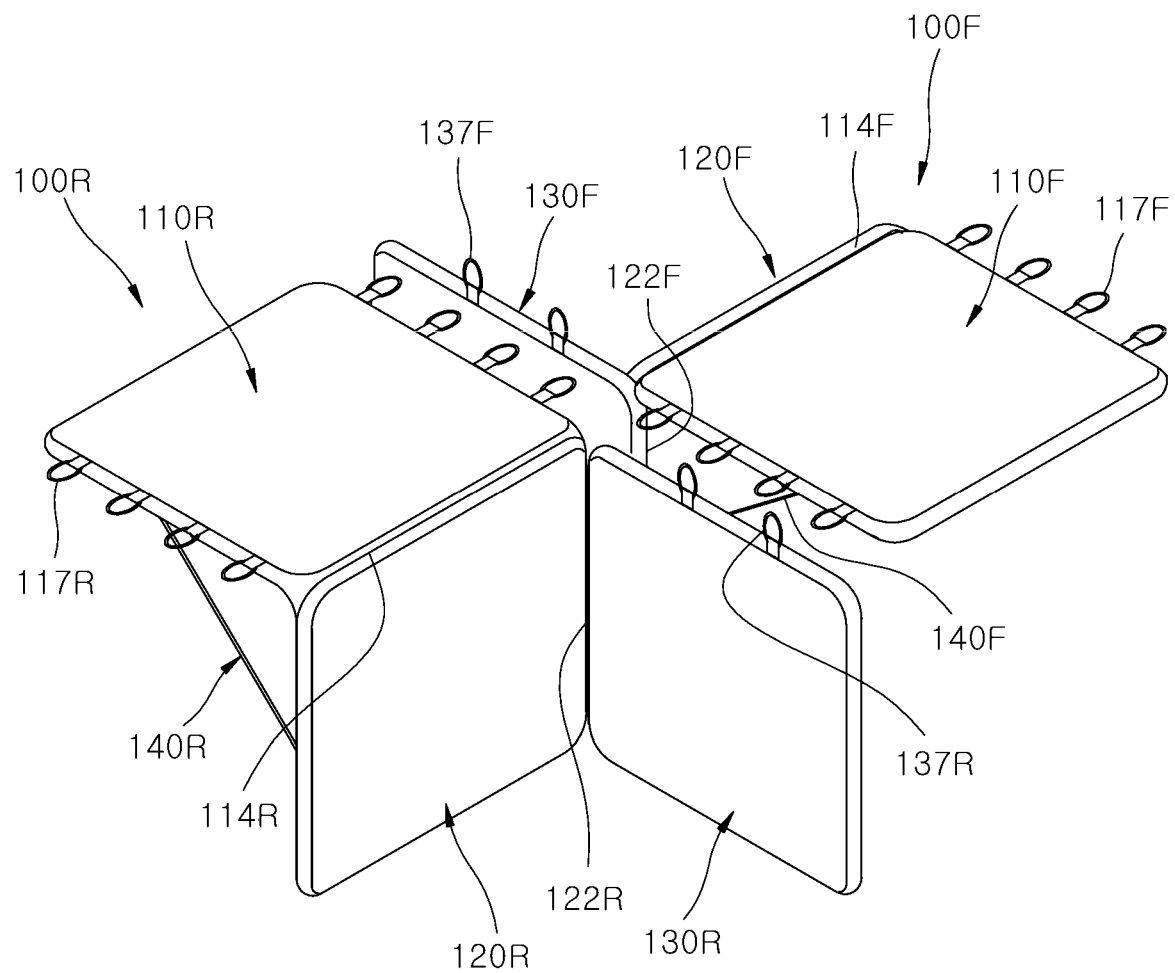
FIG. 9 is a perspective view illustrating that the rooftop airbag apparatus in accordance with the embodiment of the present disclosure is deployed.
Figure 10:
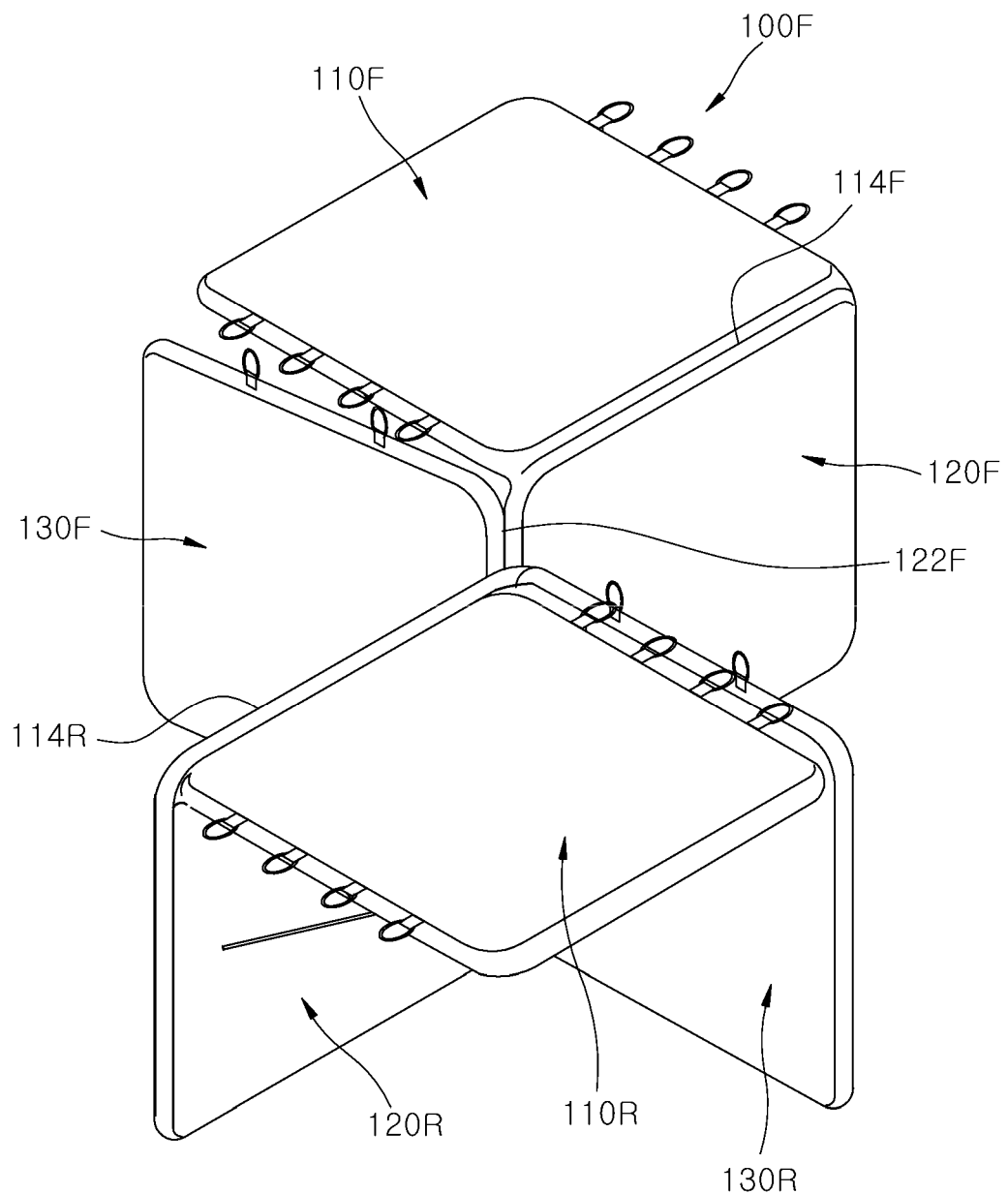
FIG. 10 is a perspective view illustrating that a modification of the rooftop airbag apparatus in accordance with the embodiment of the present disclosure is deployed.

FIG. 8 is a plan view illustrating that the rooftop airbag apparatus in accordance with the embodiment of the present disclosure is installed on the front and rear sides of the vehicle body, FIG. 9 is a perspective view illustrating that the rooftop airbag apparatus in accordance with the embodiment of the present disclosure is deployed, and FIG. 10 is a perspective view illustrating that a modification of the rooftop airbag apparatus in accordance with the embodiment of the present disclosure is deployed.

Referring to FIGS. 1, 2 and 8 to 10, the rooftop airbag apparatus 100 in accordance with the embodiment of the present disclosure includes a front airbag 100F and a rear airbag 100R.

The rooftop window 12 is installed at the ceiling of the vehicle body 10. At the ceiling, a front guide 40F is formed to guide deployment of a first front cushion 110F. Furthermore, at the ceiling, a rear guide 40R is formed to guide deployment of a first rear cushion 110R.

The front airbag 100F covers the front side of the ceiling of the vehicle body 10 or specifically the front side of the rooftop window 12, and the rear airbag 100R covers the rear side of the ceiling of the vehicle body 10 or specifically the rear side of the rooftop window 12.

The front guide 40F and the rear guide 40R may be disposed in parallel to the widthwise direction of the vehicle body 10. At this time, the pair of front guides 40F are installed above the front seat 21, and the pair of rear guides 40R are installed above the rear seat 23.

The front airbag 100F and the rear airbag 100R are disposed on the opposite side of each other in the widthwise direction of the vehicle body 10. That is, the front airbag 100F is disposed on one side of the vehicle body 10 in the widthwise direction, and the rear airbag 100R is disposed on the other side of the vehicle body 10 in the widthwise direction. The front airbag 100F and the rear airbag 100R are deployed in the opposite direction of each other.

The front airbag 100F includes a first front cushion 110F, a second front cushion 120F and a third front cushion 130F.

The first front cushion 110F is deployed along the ceiling of the front seat 21. The first front cushion 110F has a front gas injection part 112 (see FIG. 3) connected to the inflator (not illustrated). When the first front cushion 110F is deployed, the first front cushion 110F may be inflated in a rectangular plate shape to cover the front side of the ceiling of the vehicle body 10.

The second front cushion 120F is connected to the first front cushion 110F, and deployed from the first front cushion 110F toward the bottom of the vehicle body 10. The second front cushion 120F is connected to one side of the first front cushion 110F in the widthwise direction, and the first front cushion 110F has a first front passage 116 (see FIG. 3) to communicate with the second front cushion 120F. The second front cushion 120F is deployed to stand between the front seats 21. The second front cushion 120F may be inflated in a rectangular plate shape to stand between the front seats 21. The second front cushion 120F serves to prevent a collision between passengers seated on the front seats 21.

The third front cushion 130F is connected to the second front cushion 120F, and deployed in the widthwise direction of the vehicle body 10. The third front cushion 130F is connected to the rear side of the second front cushion 120F, and the second front cushion 120F has a second front passage 124 (see FIG. 3) to communicate with the third front cushion 130F. The third front cushion 130F may be inflated in a rectangular plate shape to stand between the front and rear seats 21 and 23. Specifically, the third front cushion 130F may be inflated to block about a half of the space between the front and rear seats 21 and 23.

Each of the first to third front cushions 110F, 120F and 130F may have an inner tether or inner inactive area (not illustrated) to limit an expansion thickness.

The rear airbag 100R includes a first rear cushion 110R, a second rear cushion 120R and a third rear cushion R.

The first rear cushion 110R is deployed along the ceiling of the rear seat 23. The first rear cushion 110R is deployed along the ceiling of the vehicle body 10. The first rear cushion 110R has a rear gas injection part 112 (see FIG. 3) connected to the inflator (not illustrated). When the first rear cushion 110R is deployed, the first rear cushion 110R may be inflated in a rectangular plate shape to cover the rear side of the ceiling of the vehicle body 10.

The second rear cushion 120R is connected to the first rear cushion 110R, and deployed from the first rear cushion 110R toward the bottom of the vehicle body 10. The second rear cushion 120R is connected to the other side of the first rear cushion 110R in the widthwise direction, and the first rear cushion 110R has a first rear passage 116 (see FIG. 3) to communicate with the second rear cushion 120R. The second rear cushion 120R is deployed to stand between the rear seats 23. The second rear cushion 120R may be inflated in a rectangular plate shape to block about a half of the space between the rear seats 23. The second rear cushion 120R serves to prevent a collision between passengers seated on the rear seats 23.

The third rear cushion 130R is connected to the second rear cushion 120R, and deployed in the widthwise direction of the vehicle body 10 from the second rear cushion 120R. The third rear cushion 130R is connected to the front side of the second rear cushion 120R, and the second rear cushion 120R has a second rear passage 124 (see FIG. 3) to communicate with the third rear cushion 130R. The third rear cushion 130R may be inflated in a rectangular plate shape to stand between the front and rear seats 21 and 23. The third rear cushion 130R is disposed in front of the knee of the passenger seated on the rear seat 23. The third rear cushion 130R has a length corresponding to about a half of the widthwise length of the vehicle body 10.

Each of the first to third rear cushions 110R, 120R and 130R may have an inner tether 140 or inner inactive area (not illustrated) to limit an expansion thickness.

In the case that the passenger in the front seat 21 and the passenger in the rear seat 23 are all seated to face forward, the third front cushion 130F and the third rear cushion 130R protect the head of the passenger in the rear seat when the head of the passenger seated on the rear seat 23 is moved forward.

When the passenger in the front seat 21 and the passenger in the rear seat 23 are seated to face each other, the third front cushion 130F and the third rear cushion 130R prevent a collision between the head of the passenger in the rear seat 23 and the head of the passenger in the front seat 21.

The front airbag 100F further includes a front tether 140F which connects the first and second front cushions 110F and 120F so as to deploy the second front cushion 120F downward, and the rear airbag 100R further includes a rear tether 140R which connects the first and second rear cushions 110R and 120R so as to deploy the second rear cushion 120R downward.

The front tether 140F and the rear tether 140R may be cotton tethers made of rectangular fabric. Each of the front tether 140F and the rear tether 140R may be constituted by a plurality of tether bands formed in a band shape. Furthermore, the front tether 140F may be a cotton tether, and the rear tether 140R may be constituted by a plurality of tether bands, and vice versa.

The angle between the first and second front cushions 110F and 120F may be changed according to the length of the front tether 140F, and the angle between the first and second rear cushions 110R and 120R may be changed according to the length of the rear tether 140R.

Both sides of the front tether 140F may be fixed to the first and second front cushions 110F and 120F by a tether sewing part or adhesive. When the second front cushion 120F is deployed, the front tether 140F pulls the second front cushion 120F toward the first front cushion 110F. Therefore, the second front cushion 120F may be deployed while bent downward by tension of the front tether 140F. Furthermore, when the second front cushion 120F is deployed, the front tether 140F is obliquely disposed so as not to come in contact with the head of the passenger in the front seat 21.

Both sides of the rear tether 140R may be fixed to the first and second rear cushions 110R and 120R by a tether sewing part or adhesive. When the second rear cushion 120R is deployed, the rear tether 140R pulls the second rear cushion 120R toward the first rear cushion 110R. Therefore, the second rear cushion 120R may be deployed while bent downward by tension of the rear tether 140R. Furthermore, when the second rear cushion 120R is deployed, the rear tether 140R is obliquely disposed so as not to come in contact with the head of the passenger in the rear seat 23.

A first front inactive area 114F is formed between the first and second front cushions 110F and 120F, and a second front inactive area 122F is formed between the second and third front cushions 120F and 130F. Each of the first and second front inactive areas 114F and 122F is an area where two sheets of fabric are attached to each other in order to prevent gas introduction. The first and second front inactive areas 114F and 122F may be formed by a sewing part (not illustrated). The first front inactive area 114F may be formed in parallel to the front-to-rear direction of the vehicle body 10, and the second front inactive area 122F may be formed in parallel to the top-to-bottom direction of the vehicle body 10.

Since the first front inactive area 114F is formed at the boundary between the first and second front cushions 110F and 120F, the second front cushion 120F may be deployed perpendicular or almost perpendicular to the first front cushion 110F. Since the second front inactive area 122F is formed at the boundary between the second and third front cushions 120F and 130F, the third front cushion 130F may be deployed perpendicular or almost perpendicular to the second front cushion 120F. Therefore, in case of a roll-over of the vehicle, the first front cushion 110F prevents a passenger from colliding with the rooftop window 12 or being thrown out of the vehicle, the second front cushion 120F prevents a collision between the heads of the passengers in the front seats 21, and the third front cushion 130F prevents a collision between the heads of the passengers in the front and rear seats 21 and 23.

A first rear inactive area 114R is formed between the first and second rear cushions 110R and 120R, and a second rear inactive area 122R is formed between the second and third rear cushions 120R and 130R. Each of the first and second rear inactive areas 114R and 122R is an area where two sheets of fabric are attached to each other in order to prevent gas introduction. The first and second inactive rear areas 114R and 122R may be formed by a sewing part. The first rear inactive area 114R may be formed in parallel to the front-to-rear direction of the vehicle body 10, and the second rear inactive area 122R may be formed in parallel to the top-to-bottom direction of the vehicle body 10.

Since the first rear inactive area 114R is formed at the boundary between the first and second rear cushions 110R and 120R, the second rear cushion 120R may be deployed perpendicular or almost perpendicular to the first rear cushion 110R. Since the second rear inactive area 122R is formed at the boundary between the second and third rear cushions 120R and 130R, the third rear cushion 130R may be deployed perpendicular or almost perpendicular to the second rear cushion 120R. Therefore, in case of a roll-over of the vehicle, the first rear cushion 110R prevents a passenger from colliding with the rooftop window 12 or being thrown out of the vehicle, the second rear cushion 120R prevents a collision between the heads of the passengers in the rear seats 23, and the third rear cushion 130R prevents a collision between the heads of the passengers in the front and rear seats 21 and 23.

The third front cushion 130F is deployed in the same direction as the deployment direction of the first front cushion 110F, and the third rear cushion 130R is deployed in the same direction as the deployment direction of the first rear cushion 110R. For example, when the first front cushion 110F is deployed from one side of the vehicle body 10 in the widthwise direction toward the center thereof, the third front cushion 130F may be deployed from the center of the vehicle body 10 in the widthwise direction toward the other side thereof. Furthermore, when the first rear cushion 110R is deployed from the other side of the vehicle body 10 in the widthwise direction toward the center thereof, the third rear cushion 130R may be deployed from the center of the vehicle body 10 in the widthwise direction toward the one side thereof.

The first front cushion 110F has a plurality of first front rings 117F connected to either side thereof in the front-to-rear direction such that the plurality of first front rings 117F are movably coupled to the front guide 40F, and the third front cushion 130F has a plurality of third front rings 137F connected to the top thereof such that the plurality of third front rings 137F are movably coupled to the front guide 40F. The first front rings 117F support both sides of the first front cushion 110F when the first front cushion 110F is deployed, and the third front rings 137F support the top of the third front cushion 130F when the third front cushion 130F is deployed.

The first rear cushion 110R has a plurality of first rear rings 117R connected to either side thereof in the front-to-rear direction such that the plurality of first rear rings 117R are movably coupled to the rear guide 40R, and the third rear cushion 130R has a plurality of third rear rings 137R connected to the top thereof such that the plurality of third rear rings 137R are movably coupled to the rear guide 40R. The first rear rings 117R support both sides of the first rear cushion 110R when the first rear cushion 110R is deployed, and the third rear rings 137R support the top of the third rear cushion 130R when the third rear cushion 130R is deployed.

The first front cushion 110F is folded in a zigzag shape, and the third front cushion 130F is folded in a zigzag shape. The third front cushion 130F formed in a zigzag shape wound in a roll shape with the second front cushion 120F. Therefore, the first front cushion 110F folded in a zigzag shape is unfolded and deployed in a straight line shape, the second front cushion 120F wound in a roll shape is unwound and deployed downward, and the third front cushion 130F folded in a zigzag shape is unfolded and deployed in a straight line shape.

The first rear cushion 110R is folded in a zigzag shape, the third rear cushion 130R is folded in a zigzag shape. The third rear cushion 130R folded in a zigzag shape is wound in a roll shape with the second rear cushion 120R. Therefore, the first rear cushion 110R folded in a zigzag shape is unfolded and deployed in a straight line shape, the second rear cushion 120R wound in a roll shape is unwound and deployed downward, and the third rear cushion 130R folded in a zigzag shape is unfolded and deployed in a straight line shape.

The third front cushion 130F is deployed in the opposite direction of the deployment direction of the first front cushion 110F, and the third rear cushion 130R is deployed in the opposite direction of the deployment direction of the first rear cushion 110R (see FIG. 10). Therefore, the third front cushion 130F and the third rear cushion 130R are disposed in parallel to each other in the widthwise direction of the vehicle body 10. In addition, a separate front guide 40F and a separate rear guide 40R may be further installed to guide movement of the third front rings 137F and the third rear rings 137R when the third rear cushion 130R is deployed.

The operation of the rooftop airbag apparatus in accordance with the embodiment of the present invention will be described.

Figure 11:
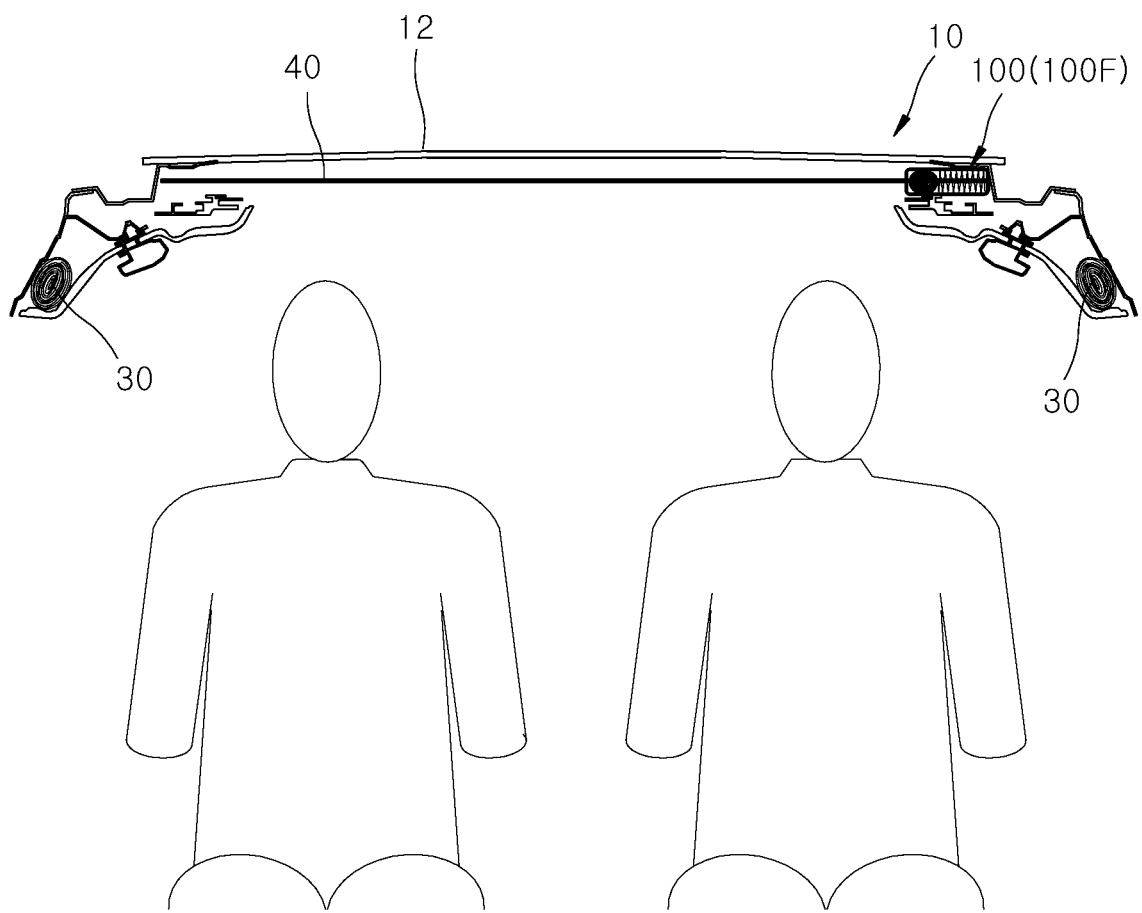
FIG. 11 is a cross-sectional view illustrating that the rooftop airbag apparatus in accordance with the embodiment of the present disclosure is installed on one side of the vehicle body.
Figure 12:
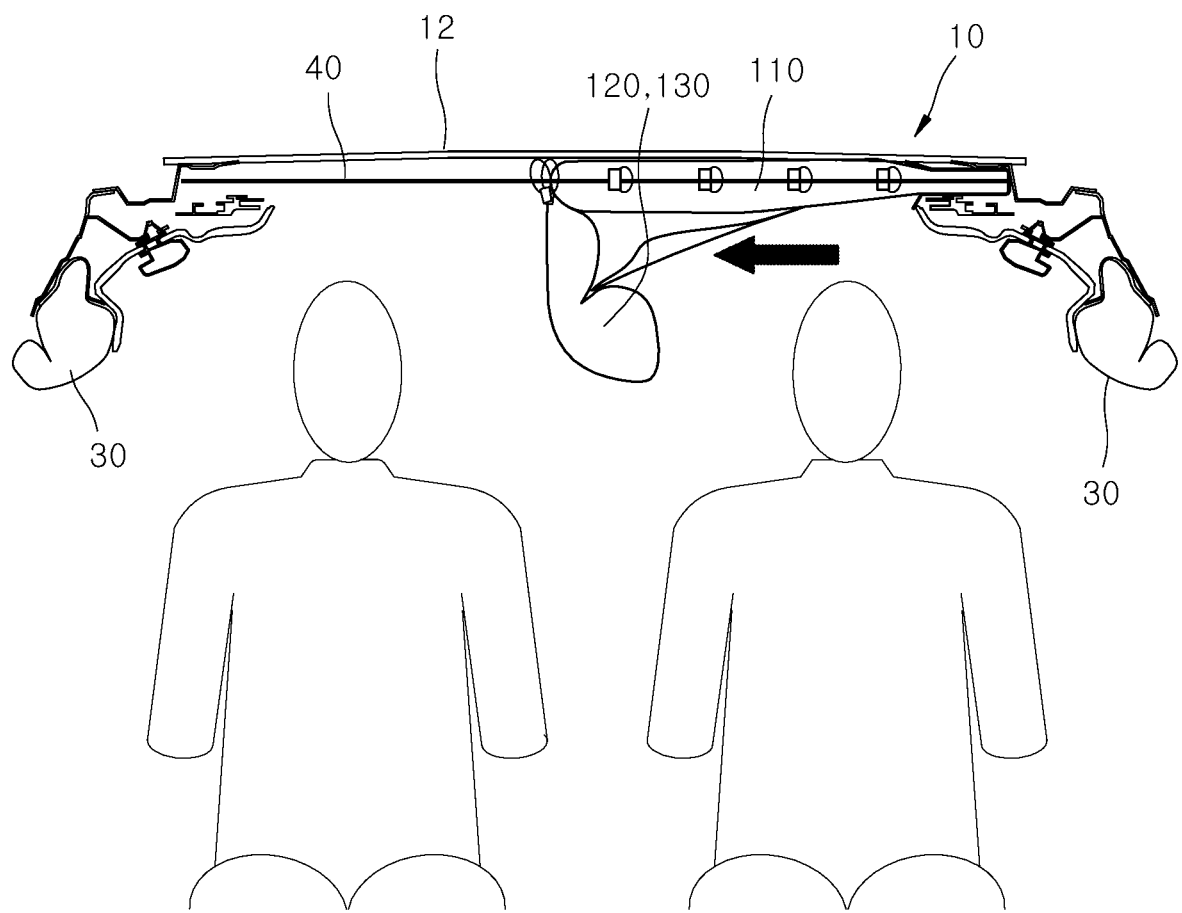
FIG. 12 is a cross-sectional view illustrating that the first cushion is deployed in the rooftop airbag apparatus in accordance with the embodiment of the present disclosure.
Figure 13:
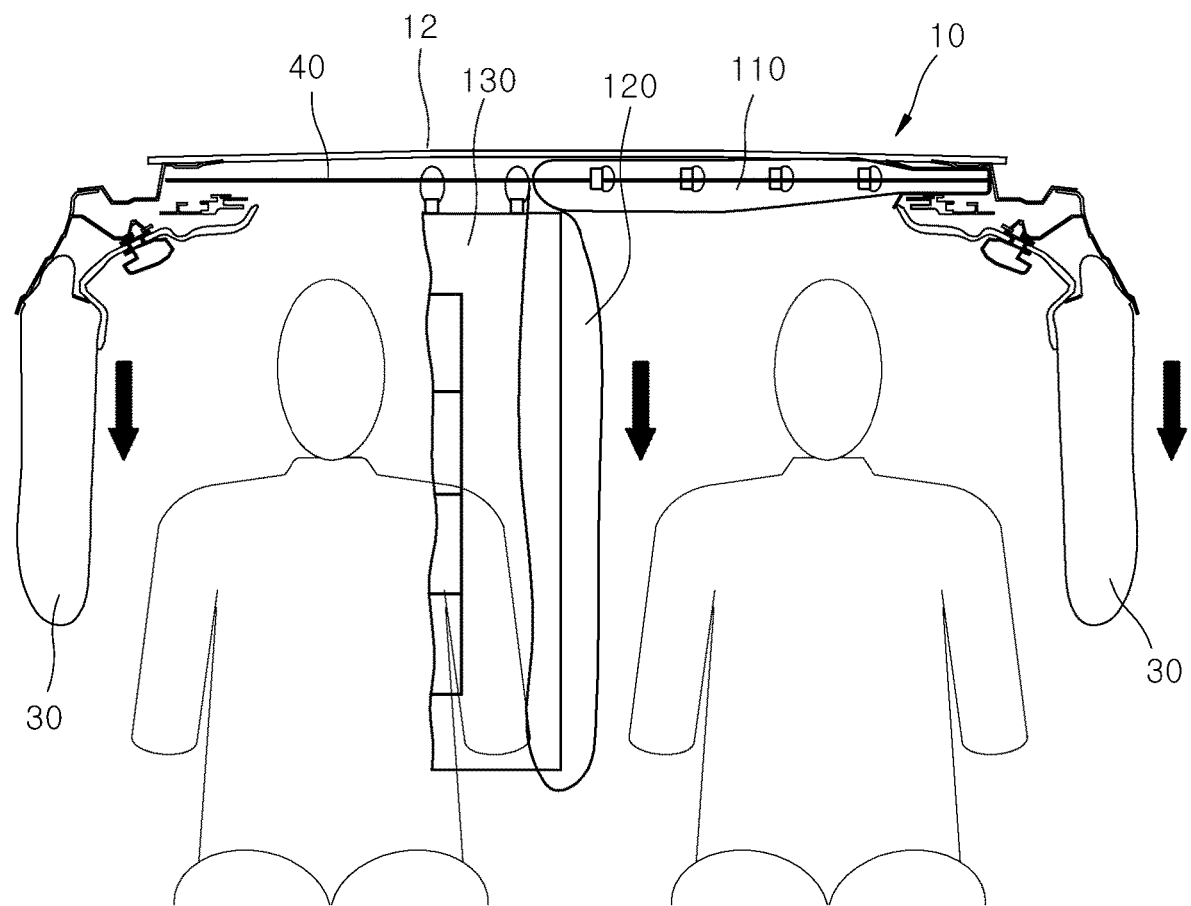
FIG. 13 is a cross-sectional view illustrating that the second cushion and the curtain airbag are deployed in the rooftop airbag apparatus in accordance with the embodiment of the present disclosure.
Figure 14:
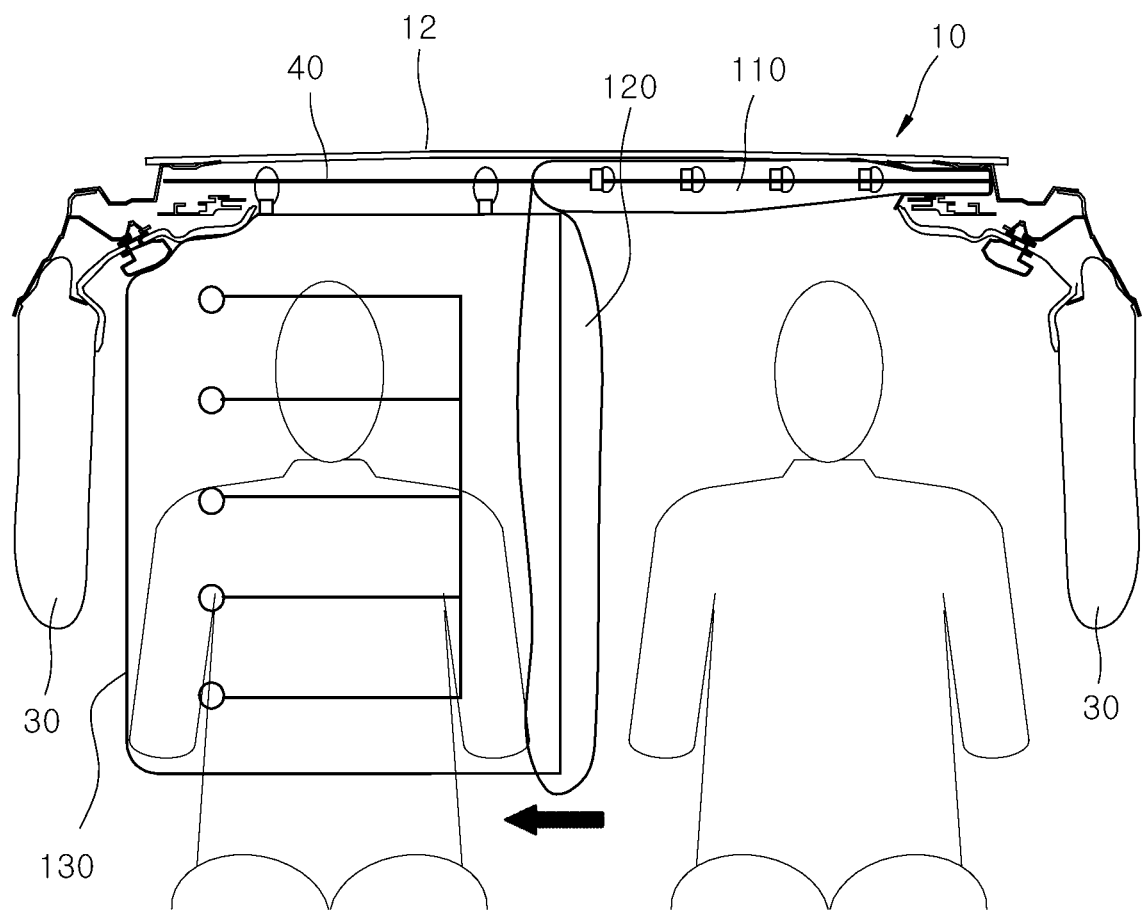
FIG. 14 is a cross-sectional view illustrating that the third cushion is deployed in the rooftop airbag apparatus in accordance with the embodiment of the present disclosure.

FIG. 11 is a cross-sectional view illustrating that the rooftop airbag apparatus in accordance with the embodiment of the present disclosure is installed on one side of the vehicle body, FIG. 12 is a cross-sectional view illustrating that the first cushion is deployed in the rooftop airbag apparatus in accordance with the embodiment of the present disclosure, FIG. 13 is a cross-sectional view illustrating that the second cushion and the curtain airbag are deployed in the rooftop airbag apparatus in accordance with the embodiment of the present disclosure, and FIG. 14 is a cross-sectional view illustrating that the third cushion is deployed in the rooftop airbag apparatus in accordance with the embodiment of the present disclosure.

Referring to FIGS. 11 and 14, passengers may be seated on the seats 21 and 23 so as to face forward or face each other, while the vehicle is driven or autonomously operates.

When the front inflator and the rear inflator are all driven in case of a collision of the vehicle, the front airbag 100F and the rear airbag 100R are deployed at the same time. The front airbag 100F is deployed in order of the first to third front cushions 110F, 120F and 130F, and the rear airbag 100R is deployed in order of the first to third rear cushions 110R, 120R and 130R. Furthermore, the curtain airbag 30 of the vehicle is also deployed.

At this time, the first front cushion 110F and the first rear cushion 110R cover the ceiling. The second front cushion 120F is disposed to stand between the front seats 21, and the second rear cushion 120R is disposed to stand between the rear seats 23. The third front cushion 130F and the third rear cushion 130R are disposed to stand between the front seats 21 and the rear seats 23. Therefore, the inner space of the vehicle is divided into four spaces by the second front cushion 120F, the second rear cushion 120R, the third front cushion 130F and the third rear cushion 130R.

Therefore, although the head of the passenger seated on the rear seat 23 is moved forward in case of a collision of the vehicle, the head of the passenger may be protected by the third front cushion 130F and the third rear cushion 130R. Furthermore, the second front cushion 120F prevents a collision between the passengers seated on the front seats 21, and the second rear cushion 120R prevents a collision between the passengers seated on the rear seats 23. Furthermore, the first front cushion 110F and the first rear cushion 110R prevent the passengers from being thrown out of the vehicle through the rooftop window 12 of the ceiling.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:
1. A rooftop airbag apparatus comprising:
a first cushion configured to be deployed along a ceiling of a vehicle body;
a second cushion connected to the first cushion and configured to be deployed toward a bottom of the vehicle body;
a third cushion connected to the second cushion and configured to be deployed in a widthwise direction of the vehicle body; and
a tether connected to the first and second cushions such that the second cushion is configured to be deployed toward the bottom of the vehicle body,
wherein:
the first cushion is foldable in a zigzag shape; and
the third cushion is foldable in a zigzag shape.
2. The rooftop airbag apparatus of claim 1, wherein:
a first inactive area is provided between the first and second cushions; and
a second inactive area is provided between the second and third cushions.
3. The rooftop airbag apparatus of claim 1, wherein the third cushion is configured to be deployed in a same direction as a deployment direction of the first cushion.
4. The rooftop airbag apparatus of claim 1, wherein the third cushion is configured to be deployed in an opposite direction of a deployment direction of the second cushion.
5. The rooftop airbag apparatus of claim 1, wherein the third cushion is wound in a roll shape with the second cushion when in a folded state.
6. A rooftop airbag apparatus comprising:
a front airbag configured to cover a front side of a ceiling of a vehicle body; and
a rear airbag configured to cover a rear side of the ceiling of the vehicle body,
wherein:
the front airbag comprises:
a first front cushion configured to be deployed along the ceiling of a front seat;
a second front cushion connected to the first front cushion, and configured to be deployed from the first front cushion toward a bottom of the vehicle body; and
a third front cushion connected to the first front cushion, and configured to be deployed in widthwise direction of the vehicle body from the second front cushion;
the rear airbag comprises:
a first rear cushion configured to be deployed along the ceiling of a rear seat;
a second rear cushion connected to the first rear cushion, and configured to be deployed from the first rear cushion toward the bottom of the vehicle body; and
a third rear cushion connected to the second rear cushion, and configured to be deployed in widthwise direction of the vehicle body from the second rear cushion;

the front airbag further comprises a front tether connected to the first and second front cushions such that the second front cushion is configured to be deployed toward the bottom of the vehicle;
the rear airbag further comprises a rear tether connected to the first and second rear cushions such that the second rear cushion is configured to be deployed toward the bottom of the vehicle body;
the first cushion is foldable in a zigzag shape; and
the third cushion is foldable in a zigzag shape.

7. The rooftop airbag apparatus of claim 6, wherein:
a first front inactive area is provided between the first and second front cushions; and
a second front inactive area is provided between the second and third front cushions.

8. The rooftop airbag apparatus of claim 6, wherein:
a first rear inactive area is provided between the first and second rear cushions; and
a second rear inactive area is provided between the second and third rear cushions.

9. The rooftop airbag apparatus of claim 6, wherein:
the third front cushion is configured to be deployed in same direction as a deployment direction of the first front cushion; and
the third rear cushion is configured to be deployed in same direction as a deployment direction of the first rear cushion.

10. The rooftop airbag apparatus of claim 6, wherein:
the third front cushion is configured to be deployed in an opposite direction of a deployment direction of the first front cushion; and
the third rear cushion is configured to be deployed in an opposite direction of a deployment direction of the first rear cushion.

11. The rooftop airbag apparatus of claim 6, wherein the third front cushion is wound in a roll shape with the second front cushion when in a folded state.

12. The rooftop airbag apparatus of claim 6, wherein:
the first rear cushion is foldable in a zigzag shape,
the third rear cushion is foldable in a zigzag shape, and
the third rear cushion is wound in a roll shape with the second rear cushion when in a folded state.

13. A rooftop airbag apparatus comprising:
a front airbag configured to cover a front side of a ceiling of a vehicle body; and
a rear airbag configured to cover a rear side of the ceiling of the vehicle body,
wherein:
the front airbag comprises:
a first front cushion configured to be deployed along the ceiling of a front seat;
a second front cushion connected to the first front cushion, and configured to be deployed from the first front cushion toward a bottom of the vehicle body; and
a third front cushion connected to the first front cushion, and configured to be deployed in widthwise direction of the vehicle body from the second front cushion;
the rear airbag comprises:
a first rear cushion configured to be deployed along the ceiling of a rear seat;
a second rear cushion connected to the first rear cushion, and configured to be deployed from the first rear cushion toward the bottom of the vehicle body; and
a third rear cushion connected to the second rear cushion, and configured to be deployed in widthwise direction of the vehicle body from the second rear cushion;
a front guide is formed at the ceiling to guide deployment of the first front cushion;
a rear guide is formed at the ceiling to guide deployment of the first rear cushion;
the third front cushion and the third rear cushion are disposed in parallel to each other in the widthwise direction of the vehicle body;
the first front cushion has a plurality of first front rings connected to either side of the first front cushion in the front-to-rear direction such that the plurality of first front rings are movably coupled to the front guide, and the third front cushion has a plurality of third front rings connected to the top of the third front cushion such that the plurality of third front rings are movably coupled to the front guide;
the first rear cushion has a plurality of first rear rings connected to either side of the first rear cushion in the front-to-rear direction such that the plurality of first rear rings are movably coupled to the rear guide, and the third rear cushion has a plurality of third rear rings connected to the top of third rear cushion such that the plurality of third rear rings are movably coupled to the rear guide.

14. The rooftop airbag apparatus of claim 13, wherein:
the first front rings support both sides of the first front cushion when the first front cushion is deployed, and the third front rings support the top of the third front cushion when the third front cushion is deployed; and
the first rear rings support both sides of the first rear cushion when the first rear cushion is deployed, and the third rear rings support the top of the third rear cushion when the third rear cushion is deployed.

\* \* \* \* \*